United States Patent [19]

Pressman

[11] Patent Number: 4,695,594
[45] Date of Patent: Sep. 22, 1987

[54] MODIFIED FLAME RETARDANT POLYPHENYLENE ETHER RESINS HAVING IMPROVED FOAMABILITY AND MOLDED ARTICLES MADE THEREFROM

[75] Inventor: Eric Pressman, East Greenbush, N.Y.

[73] Assignee: General Electric Company, Selkirk, N.Y.

[21] Appl. No.: 900,705

[22] Filed: Aug. 27, 1986

[51] Int. Cl.$^4$ ................................................. C08J 9/08
[52] U.S. Cl. .................................... 521/92; 264/54; 521/79; 521/81; 521/97; 521/139; 521/146; 521/180
[58] Field of Search ...................... 521/79, 81, 92, 97, 521/139, 180; 264/54

[56] References Cited

U.S. PATENT DOCUMENTS

| | | | |
|---|---|---|---|
| 3,442,829 | 5/1969 | Moore et al. | 521/180 |
| 3,492,249 | 1/1970 | Pezarro et al. | 521/180 |
| 3,781,233 | 12/1973 | Muller et al. | |
| 3,808,300 | 4/1974 | Miyamoto et al. | 264/53 |
| 3,947,387 | 3/1976 | Lundberg | |
| 3,962,154 | 6/1976 | Elgi | 264/53 |
| 4,097,425 | 6/1978 | Niznik | 521/180 |
| 4,174,432 | 11/1979 | Niznik | 521/180 |
| 4,197,370 | 4/1980 | Fox | 521/180 |
| 4,280,005 | 7/1981 | Fox | |
| 4,288,560 | 9/1981 | Kirchmayr et al. | 521/180 |
| 4,334,030 | 6/1982 | Kochanowski | 521/180 |
| 4,467,051 | 8/1984 | Finaz et al. | 521/180 |
| 4,588,754 | 5/1986 | Liu | |

Primary Examiner—Morton Foelak
Attorney, Agent, or Firm—Hedman, Gibson, Costigan & Hoare

[57] ABSTRACT

Polyphenylene ether compositions rendered flame retardant with bromine-containing compounds can be foam molded into shaped articles free of streaking and without the generation of odors if the foaming agent comprises citric acid and sodium bicarbonate.

10 Claims, No Drawings

MODIFIED FLAME RETARDANT POLYPHENYLENE ETHER RESINS HAVING IMPROVED FOAMABILITY AND MOLDED ARTICLES MADE THEREFROM

FIELD OF THE INVENTION

The present invention relates to modified flame retardant polyphenylene ether resins having improved foamability. Such improvements are brought about by incorporating into a flame retardant polyphenylene ether resin an effective amount of a foaming agent comprising citric acid and sodium bicarbonate. The invention also relates to foamed articles especially large, high shot weight, low shot time articles, made from the modified polyphenylene ether resins. As a result of the present invention, polyphenylene ether resin compositions produce foamed articles having reduced surface streaking with no odor generation.

BACKGROUND OF THE INVENTION

Polyphenylene ether resins are high performance engineering thermoplastics having relatively high melt viscosities and softening points (i.e., in excess of 250° C.). They are useful for many commercial applications requiring high temperature resistance and can be formed into films, fibers and molded articles. For example, they can be used to form a wide range of products including household applicances, automotive parts and trim. The polyphenylene ether resins and methods of their preparation have been thoroughly described in the patent literature, including Hay, U.S. Pat. Nos. 3,306,874 and 3,306,875 and Stamatoff, U.S. Pat. Nos. 3,257,357 and 3,257,358, and elsewhere.

As is well established, the polyphenylene ether resins may be utilized alone or in admixture with styrene polymers over a broad spectrum of proportions. The resulting blends can be molded into many of the same articles made from polyphenylene ether resins alone, but with the advantage that the moldings often possess better physical and/or chemical properties. Compositions of polyphenylene ether resins and styrene polymers are also described in the patent literature, including Cizek, U.S. Pat. No. 3,383,435, and other patents known to those skilled in the art.

Compositions of polyphenylene ether resin and styrene polymers are not normally flame retardant, and there are instances when it is desirable to impart a degree of flame retardancy to the compositions such that the molded articles are better able to resist burning or melting when exposed to elevated temperatures or placed near an open flame. To this end, it has been disclosed in the art that certain halogenated compounds, and brominated compounds in particular, are effective as flame retardant additives for polyphenylene ether-polystyrene blends. An example of such a disclosure is Reinhard, U.S. Pat. No. 3,809,729.

Foamable compositions of polyphenylene ether resins with or without styrene polymers are particularly suited as sources of lightweight structural substitutes for metals, especially in the automotive industry.

Foaming agents are customarily employed to make moldable compositions including compositions containing polyphenylene ether resins. Foaming agents tend to reduce the weight of a thermoplastic composition to achieve light weight properties by decomposing under reaction conditions with the evolution of gas. Blowing agents have been used to obtain foamable compositions of a variety of thermoplastic materials as described in, for example, Muller et al., U.S. Pat. No. 3,781,233 and Fox, U.S. Pat. No. 4,280,005 and the U.S. and British patent references cited therein. Lundberg, U.S. Pat. No. 3,947,387 and Liu, U.S. Pat. No. 4,588,754 disclose foamed polymeric products using citric acid, alone, or citric acid mixed with sodium bicarbonate as foaming agents.

Halogenated flame retardants (e.g. brominated styrene) are preferred over phosphate based flame retardants because the former exhibit less stress cracking. However, previous attempts to incorporate halogenated flame retardants into polyphenylene ether/ polystyrene resins and then to foam such compositions have not been successful because the compositions tend to degrade, often giving streaked articles, and generating odors, despite efforts to use a variety of foaming agents. This is especially a problem when attempting to produce large sized articles by foaming the high shot weights (e.g., 14–16 oz. per part) and low shot times (e.g., 0.2 to 0.3 seconds per part).

Applicants have now discovered that a foaming agent comprising a combination of citric acid and sodium bicarbonate provides an effective means of making moldable compositions derived from polyphenylene ether resins, styrene polymers and halogenated flame retardants (e.g., brominated styrenes) without the evolution of undesirable by-products which lead to the decomposition of the moldable composition (e.g. surface streaking and odor generation). Moreover, the composition is uniquely suitable to produce large size foamed, shaped articles free of streaking and odor generation.

It is therefore an object of the invention to provide moldable, foamable flame retardant polyphenylene ether compositions with reduced surface streaking and odor generation.

It is still a further object of the invention to provide methods of making and using such flame retardant polyphenylene ether compositions.

It is a principal object of the present invention to produce large sized articles by foaming flame retardant polyphenylene ether resin compositions using high shot weights and short shot times.

SUMMARY OF THE INVENTION

According to the present invention, there is provided a composition adapted to the production of a flame retardant thermoplastic foam without surface streaking and odor generation, the composition comprising:

(a) a polyphenylene ether resin, alone, or combined with a styrene resin, especially a high impact polystyrene;

(b) an effective flame retardant amount of a halogenated flame retardant, alone, or in combination with an antimony compound, preferably a brominated polystyrene and most preferably a flame retardant additive of the formula:

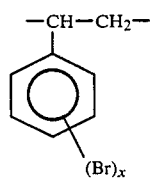

wherein x is about 2.8 and, preferably a brominated polystyrene combined with antimony oxide; and (c) an effective foam generating amount of a foaming agent comprising citric acid and sodium bicarbonate.

The present invention also provides a method improving resistance to decomposition of a foamable composition containing polyphenylene ether and a halogenated flame retardant compound.

In preferred features, the polyphenylene ether resin will comprise poly(2,6-dimethyl-1,4-phenylene ether) and copolymers thereof. The preferred flame retardant agents are brominated polystyrenes as described above. The foaming agent comprises a mixture of citric acid and sodium bicarbonate in an amount of 10 to 90% of citric acid and, correspondingly, 90 to 10% of sodium bicarbonate. Overall, the citric acid preferably comprises 0.25 to 1.0% and the sodium bicarbonate comprises from 0.15 to 0.35% based on the total weight of the composition.

DETAILED DESCRIPTION OF THE INVENTION

The polyphenylene ethers (also known as polyphenylene oxides) used in the present invention are a well known class of polymers which have become very useful commercially as a result of the discovery by Allan S. Hay of an efficient and economical method of production (See, for example, U.S. Pat. Nos. 3,306,874 and 3,306,875). Numerous modifications and variations have since been developed but, in general, they are characterized as a class by the presence of arylenoxy structural units. The present invention includes all such variations and modifications, including but not limited to those described hereinafter.

The polyphenylene ethers favored for use in the practice of this invention generally contain structural units of the following formula

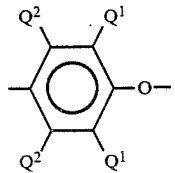

(I)

in which in each of these units independently each $Q^1$ is hydrogen, halogen, primary or secondary lower alkyl (i.e., alkyl containing up to 7 carbon atoms), phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ hydrogen.

Both homopolymers and copolymers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature, including the Hay patents mentioned above and others. Also contemplated are graft copolymers, including those prepared by grafting onto the polyphenylene ether chain such vinyl monomers as acrylonitrile and vinyl aromatic compounds (for example, styrene), and such polymers as polystyrenes and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocyclic compounds and formals.

The polyphenylene ether generally has a molecular weight (number average, as determined by gel permeation chromatography, whenever used herein) within the range of about 5,000 to 40,000. The intrinsic viscosity of the polymer is usually in the range of about 0.4 to 0.5 deciliters per gram (dl./g.), as measured in solution in chloroform at 25° C.

The polyphenylene ethers may be prepared by known methods, and typically by the oxidative coupling of at least one corresponding monohydroxyaromatic (e.g., phenolic) compound. A particularly useful and readily available monohydroxyaromatic compound is 2,6-xylenol (in which for the above formula each $Q^1$ is methyl and each $Q^2$ is hydrogen), the corresponding polymer of which may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound, such as a copper, manganese or cobalt compound, usually in combination with various other materials.

Among the preferred catalyst systems are those containing copper. Such catalysts are disclosed, for example, in the aforementioned Hay U.S. Pat. Nos. 3,306,874 and 3,306,875, and elsewhere. They are usually combinations of cuprous or cupric ions, halide ions (i.e., chloride, bromide or iodide), and at least one amine.

Also preferred are catalyst systems containing manganese. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, alpha-hydroxyoximes (both monomeric and polymeric), o-hydroxyaryl oximes, and alpha-diketones. Also useful are cobalt-containing catalyst systems. Those skilled in the art will be familiar with patents disclosing manganese and cobalt-containing catalyst systems for polyphenylene ether preparation.

Especially useful polyphenylene ethers for the purposes of this invention are those which comprise molecules having at least one of the end groups of formulas II and III, below, in which $Q^1$ and $Q^2$ are as previously defined, each $R^1$ is independently hydrogen or alkyl, providing that the total number of carbon atoms in both $R^1$ radicals is 6 or less, and each $R^2$ is independently hydrogen or a $C_{1-6}$ primary alkyl radical. Preferably, each R1 is hydrogen and each $R^2$ is alkyl, especially methyl or n-butyl.

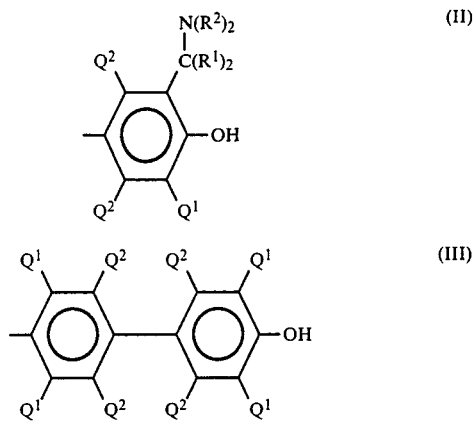

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the alpha-hydrogen atoms on one or more $Q^1$ radicals adjacent to the hydroxy group on the terminal unit of the polymer chain. During further processing and/or blending, the aminoalkylsubstituted end groups may undergo various reactions, probably involving a quinone methide-type intermediate of formula IV, below ($R^1$ is defined as above), with beneficial effects often including an increase in impact strength and compatibilization with other blend components.

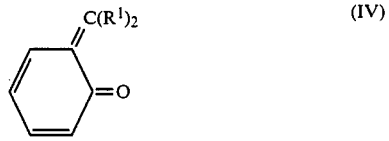

Polymers with biphenol end groups of formula III are typically obtained from reaction mixtures in which a by-product diphenoquinone of formula V, below, is present, especially in a copper-halide-secondary or tertiary amine system. In this regard, the disclosures of the U.S. Pat. Nos. 4,234,706, 4,477,649 and 4,482,697 are particularly pertinent, and are incorporated herein by reference. In mixtures of this type, the diphenoquinone is ultimately incorporated into the polymer in substantial amounts, chiefly as an end group.

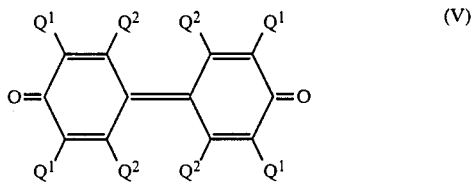

In many polyphenylene ethers obtained under the conditions described above, a substantial proportion of the polymer molecules, usually as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will thus be apparent to those skilled in the art that a wide range of polymeric materials encompassing the full recognized class of polyphenylene ether resins are contemplated as suitable for use in the practice of the present invention.

In the embodiments disclosed herein, compositions of polyphenylene ethers when combined with styrene resins can be made following the teachings in Cizek, U.S. Pat. No. 3,383,435. Although the blends can vary from 1 to 99 to 99 to 1, particularly preferred compositions comprise from 25 to 75 parts by weight of a polyphenylene ether in combination with 75 to 25 parts by weight of a styrene resin.

The styrene resins, e.g., the rubber modified, polystyrenes which may optionally be used in the present composition may be selected from any of the materials known generally in the art, including high impact polystyrenes, or HIPS. In general, these modified polystyrene resins are made by adding rubber during or after polymerization of the styrene, to yield an interpolymer of rubber and polystyrene, a physical admixture of rubber and polystyrene, or both, depending on the particular process employed.

Suitable rubber modifiers include polybutadiene, polyisoprene, polychloroprene, ethylene-propylene copolymers (EPR), ethylene-propylene-diene (EPDM) rubbers, styrene-butadiene copolymers (SBR), and polyacrylates. The amount of rubber employed will vary, depending on such factors as the process of manufacture and individual requirements.

Included within this family of materials for purposes of the present invention are more recently developed forms in which such factors as the rubber particle size, the gel and cis contents of the rubber phase, and the rubber volume percent are regulated or controlled to achieve improvements in the impact resistance and other properties. These kinds of HIPS are described in the patent literature, including U.S. Pat. No. 4,128,602 (Abolins, Katchman and Lee, Jr.), and U.S. Pat. No. 4,528,327 (Cooper and Katchman), which are incorporated herein by reference.

Also contemplated as suitable for use are high impact polystyrenes having morphological forms which are sometimes referred to as core-shell, comprising particles of rubber encapsulated polystyrene dispersed in a matrix of polystyrene resin. Examples of this type are disclosed in U.S. Pat. No. 4,513,120 (Bennett, Jr. and Lee, Jr.), as well as the above-mentioned U.S. Pat. No. 4,528,327.

Preferably the styrene resin is one having at least 25% by weight of polymer units derived from a compound having the formula

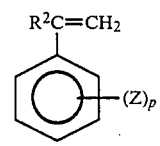

where $R^2$ is hydrogen, lower alkyl or halogen; Z is a member selected form the class consisting of. vinyl, hydrogen, chlorine and lower alkyl; and p is 0 or a whole number of from 1 to 5. Examples include rubber modified polystyrenes and styrene containing copolymers such as the styreneacrylontrile copolymers (SAN), styrene-butadiene copolymers, styrene-acrylonitrilealpha-alkyl styrene copolymers, styrene-acrylonitrilebutadiene copolymers (ABS), poly-alpha-methylstyrene, copolymers of ethyl vinyl benzene, divinyl benzene and the like. The most preferred styrene resins are the high impact polystyrenes.

Halogenated compounds, especially brominated styrenes are known in the art as effective flame retardant agents. The brominated styrenes include mono-, di-, tri-, tetra- and pentabromo styrenes and mixtures thereof. Such compounds have the formula

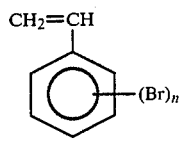

wherein n is 1 to 5, preferably 2.5–3.5.

Methods of preparing brominated styrenes are known in the art and typically involve hydrobromination of the vinyl group followed by bromination of the nuclear ring of the bromo ethyl group to form the desired product as disclosed for example in Hornbaker et al. U.S. Pat. No. 4,279,808 and Jackisch, U.S. Pat. No. 4,423,262. A preferred brominated flame retardant agent is one within the above formula wherein n is about 2.8.

The blowing agents used in this invention are citric acid/sodium bicarbonate concentrate blowing agents. These are known blowing agents and are available from many commercial sources including C.H. Boehringer Sohn under the tradename Hydrocerol. Especially preferred is Hydrocerol Compound (citric acid/sodium bicarbonate). Special mention is made of Hydrocerol CLM70 supplied by Henly and Company, New York, New York. This formulation contains a polyethylene wax binder and has about 70% by weight of active ingredients. The decomposition temperature range is generally from about 150° C. to about 210° C., and the sole gaseous decomposition product is carbon dioxide. These are preferred because neither the gaseous nor the solid decomposition products have deleterious effects on the thermoplastic polymers. Furthermore, unlike numerous other blowing agents, these blowing agents do not need the presence of nucleating agents or activators in order to achieve uniformity of cells, although it is preferred. Additionally, these blowing agents produced foams having the most uniform, fine cellular structure.

The foaming agent can be added as a solid powder, as a dispersion in an inert liquid or with a diluent such as silica or a neutral clay or as a concentrate wherein a high concentration of the foaming agent is carried in a carrier polymer such as, for example, polyethylene. The particle size of the foaming agent is usually sufficiently small to facilitate uniform blending with the thermoplastic polymers and is generally less than about 50 microns. However, since many commerical foaming agents are available in aggregate form, the particular size of the aggregate will be somewhat larger.

The amount of blowing agent dispersed in the thermoplastic is that amount which is sufficient to provide a uniform, essentially closed cell foam manifesting the desired weight reduction and other physical properties. The density of the foam is preferably in the range of about 0.4 to 1.2 g/cc, more preferably from about 0.7 to 1.0 g/cc.

The amount of blowing agent used for the desired foam density will depend on the particular blowing agent selected, on the amount of gas generated by it upon decomposition and will depend on the particular melt blending and extrusion process selected because the efficiency of the blowing agent can be affected by the tendency of a particular melt extruder to allow gaseous products to escape from the extruder. In general, the amount will range from about 0.05 to about 1.5% by weight based on the polymer, preferably from about 0.1 to about 0.8% by weight, based on the polymer, to provide a sufficient degree of foaming without yielding an undesirably low density or open pore structure.

As is conventional, a synergist, e.g., an antimony compound can be used with the flame retardant, and this is usually preferred. Antimony oxide, for example, reduces the total amount of flame retardant halogen compound needed.

In formulating the compositions in accordance with the present invention, amounts for the above-mentioned components of the composition preferably fall within certain ranges, as follows.

| COMPONENTS | AMOUNT (Parts by Weight) |
|---|---|
| (a) polyphenylene ether, alone or combined w/a styrene resin | 75 to 95 |
| (b) flame retardant | 1 to 25 |
| (c) citric acid/sodium bicarbonate | 0.05 to 1.5 |

The specified amounts are based on 100 parts by weight total of (a), (b) and (c) combined.

The weight ratio of polyphenylene ether resin to any styrene resin can vary from 1 to 99 to, correspondingly, 99 to 1. Preferably it will be in the range of 25 to 75 to, correspondingly, 75 to 25.

The present compositions can also be formulated to include other ingredients in addition to those just described. These may be selected from among conventional materials commonly employed in polyphenylene ether resin blends. Examples are plasticizers, mold release agents, melt viscosity reducers, colorants, stabilizers, antioxidants, mineral fillers (for example, clay), glass reinforcements, titanium oxides, lubricants, fragrances and so forth. Conventional amounts varying, for example, from less than 1 to greater than 50 percent by weight, per 100 percent by weight of the total composition, may be utilized.

The compositions can also be modified to include impact strength improving amounts of polymeric impact improvers, such as rubbery styrenic block copolymers, for example, di- or triblock copolymers of styrene and butadiene or the hydrogenated derivatives, i.e., styrene and ethylene/butylene, as well as core-shell polymers, e.g., polyacrylate core/styrene shell interpolymers.

Generally, the structural foams of the present invention may be prepared by any of the known methods in the art. For example, the foams may be prepared by dry mixing the blowing agent and polymer composition, and thereafter melt blending the composition in an extruder. The foams may be injection molded, extruded and the like to produce finished articles to stock materials.

DESCRIPTION OF THE SPECIFIC EMBODIMENTS

The invention is further illustrated in the description below, which is set forth to show a preferred or best embodiment.

EXAMPLE 1

A composition was prepared comprising a polyphenylene ether resin (intrinsic viscosity 0.40 dl./g.), a high impact rubber-modified polystyrene resin, a polybrominated polystyrene flame retardant, antimony oxide flame retardant synergist, a plasticizer, an impact modifier, a rubber modified polystyrene (Hoechst, HOSTASTAT, HS-1), zinc sulfide and zinc oxide as stabilizers, titanium dioxide as a pigment and a citric acid/sodium bicarbonate based blowing agent system. The composition was extrusion blended in a 30 mm extruder at a temperature profile of 350-400-450-530-530-530°-530° F. and comminuted into molding pellets. It was foam molded into workpieces using a Toshiba foam injection molding machine at barrel temperatures of 400-560-560-540° F. (profile) and mold temperature of 90° F. For comparison purposes, slabs were molded from identical compositions using a state-of-the-art blowing agent, a preblend of a 70/30 w/w combination of, azodicarbonamide and 5-phenyl-3,6-dihydro-1,3,4-oxadiazin-2-one in a plasticized high impact polystyrene resin, 8% by weight active ingredients, using in this case, a Siemag molding machine and producing 18"×6"×0.250" end gated panels, for testing. The formulations used and the results obtained are set forth in Table 1:

TABLE 1
Foamed Flame Retardant Polyphenylene Ether Compositions

| Example | 1 | 1A* |
|---|---|---|
| Composition (parts by weight) | | |
| Poly(2,6-dimethyl-1,4-phenylene ether) | 50 | 50 |
| Rubber Modified Polystyrene (9% polybutadiene) | 50 | 50 |
| Polybrominated Polystyrene[a] | 9.5 | 9.5 |
| Antimony Oxide | 3.3 | 3.3 |
| Butylene o-phthalate plasticizer | 7.5 | 7.5 |
| Styrene-ethylene butylene block copolymer impact modifier[b] | 5 | 5 |
| Rubber modified polystyrene[c] | 1 | 1 |
| Zinc sulfide stabilizer | 0.15 | 0.15 |
| Zinc oxide stabilizer | 0.15 | 0.15 |
| Titanium dioxide pigment | 5 | 5 |
| Citric acid/sodium bicarbonate blowing agent[d], phr | 1 | — |
| Azodicarbonamide/5-phenyl-3,6-dihydro-1,3,4-oxadiazine-2-one[e] | — | 6 |
| Properties | | |
| Surface streaking | none | brown |
| Odor generation | none | substantial |

*Comparison
[a]Ferro Co. PC68PB
[b]Shell Chemical Company Kraton G1652
[c]Hoechst Co., HOSTASTAT
[d]Henly and Co., Hydrocerol CLM 70
[e]U.S. Pat. No. 4,097,425, Example 1, 8% active ingredients in plasticized high impact rubber modified polystyrene No discoloration was observed in Example 1 or other signs of resin decomposition when large parts were foam molded. The addition of thermal stabilizer, e.g., epoxidized soybean oil and/or dialkyl tin dimaleate to the comparison formulation did not reduce the amount of decomposition. Moreover, the physical properties of the article of Example 1 were comparable to those of the comparative example even though all of the previously described decomposition was eliminated and in spite of the fact that less foaming agent was required. The foam density was 0.90 g./cc.

EXAMPLES 2-8

The general procedure of Example 1 was repeated making formula adjustments and substituting other flame retardant agents as well as adding other ingredients. The compositions were foam molded and tested for density, surface appearance and odor generation. The compositions used and the results obtain are set forth in Table 2:

TABLE 2
Foamed Flame Retardant Polyphenylene Ether Compositons

| Example | 2 | 3 | 4 | 5 | 6 | 7 | 8 |
|---|---|---|---|---|---|---|---|
| Composition (parts by weight) | | | | | | | |
| Poly(2,6-dimethyl-1,4-phenylene ether | 50 | 50 | 50 | 50 | 50 | 50 | 50 |
| High-impact rubber modified polystyrene (9% polybutadiene) | 50 | 50 | 50 | 50 | 50 | 50 | 50 |
| Polybrominated Polystyrene A[a] | 9.5 | 10 | 10 | 10 | 5.5 | — | — |
| Polybrominated Polystyrene B[b] | — | — | — | — | — | 9.5 | 10 |
| Polybrominated bis-o-phthalate[c] | — | — | — | — | 7.5 | — | — |
| Antimony oxide | 3.3 | 3.4 | 3.4 | 3.4 | 3.4 | 3.4 | 3.4 |
| Butylene o-phthalate plasticizer[d] | 7.5 | 7.5 | 7.5 | 7.5 | 7.5 | 7.5 | 7.5 |
| Styrene ethylene butylene block copolymer[e] | 5.0 | 4.0 | 4.0 | 4.0 | 5.0 | 5.0 | 5.0 |
| Rubber Modified Polystyrene[f] | 1.0 | 1.2 | 1.2 | 1.2 | 1.0 | 1.0 | 1.0 |
| Zinc sulfide | 0.15 | 0.15 | 0.15 | 0.15 | 0.15 | 0.15 | 0.15 |
| Zinc Oxide | 0.15 | 0.15 | 0.15 | 0.15 | 0.15 | 0.15 | 0.15 |
| Titanium dioxide | 5.0 | — | — | — | 5.0 | 5.0 | 5.0 |
| fumed silica[g] | — | — | 0.5 | — | — | — | — |
| pigment[h] | — | — | 0.38 | — | — | — | — |
| pigment[i] | — | — | 0.22 | — | — | — | — |
| pigment[j] | — | — | 0.06 | 0.5 | — | — | — |
| Fragrance[k] | 0.3 | — | 0.3 | — | — | — | — |
| Citric acid/sodium bicarbonate blowing agent | 1.0 | 1.0 | 1.0 | 1.0 | 1.0 | 1.0 | 1.0 |
| Properties | | | | | | | |
| Surface streaking | none | none | none | none | none | none | none |
| Odor generation | none | none | none | none | none | none | none |

[a]Ferro Co. PC68PB
[b]Great Lakes Co. CN348L
[c]Pennwalt Co. FR40B
[d]ADMEX 433B
[e]Shell Co. KRATON G1652
[f]Hoechst Co. HOSTASTAT
[g]Cabot Co., Cabosil M-F
[h]No. 909
[i]No. MMC 314
[j]No. M 800
[k]IFF Co. Green Apple The foamed articles exhibited no surface streaking or odor generation.

In addition to foam density measurements, other physical property measurements and flammability tests were made on the articles of Example 1, 6 and 8 and in state-of-the-art Comparative Example 1A. The results are set forth in Table 3:

TABLE 3
Physical and Flammability Properties of Flame Retardant Polyphenylene Ether Found Compositions

| Example | 1A | 1 | 7 | 9 |
|---|---|---|---|---|
| Properties | | | | |
| Flammability rating, Underwriters Laboratory UL 94 | V-O | V-O(3) | V-O(2) | V-O(3) |
| | pass | pass | pass | pass |
| Heat distortion temp. @ 266 psi, °F. | 180 | 187 | 193 | 188 |
| Melt viscosity, poise | 1345 | 1326 | 1345 | 1249 |
| Tensile yield, psi | 3400 | 3775 | 4598 | 4264 |
| Flexural modulus, kpsi | 261 | 264 | 304 | 300 |
| Flexural strength, psi | 6800 | 6995 | 8075 | 7620 |
| Ductile impact (Dynatup) units | 200 | 224 | 188 | 144 |

The foregoing tables demonstrate that the compositions according to this invention meet or exceed the properties exhibited by the state of the art composition. The parts also show improved processability in large part from molding and improved surface in low pressure foam, and excellent appearance in counter pressure foam. The use of certain flame retardants in combination, Example 6, can obviate the need to use a plasticizer. Other tests have shown that impact strength retention is excellent even at the highest weight reductions. The addition of fragrance, while unnecessary, does not adversely affect physical properties, even in thin walled forms when using the blowing agent of this invention. No decomposition was evident even when molding a 3.5 pound part at a 0.8 second high shot speed.

When used herein and in the appended claims the terms "high shot weight" means in excess of about 0.5 pound per workpiece and the term "low shot time" or "high shot speed" means less than about 2 seconds/cycle.

The above-mentioned patents and publications are incorporated herein by reference.

Many variations of the present invention will be obvious to those skilled in this art in light of the above, detailed description. For example, instead of poly(2,6-dimethyl-1,4-phenylene ether) other resins can be used, such as poly(2,6-dimethyl-co-2,3,6-trimethyl-1,4-phenylene ether). All such obvious variations are within the full intended scope of the appended claims.

The rubber-modified styrene resin can be replaced by a styrene homopolymer, or it can be omitted from the composition. The antimony oxide can be replaced into other antimony compounds such as an antimony ester, or it can be omitted. Instead of a brominated polystyrene, a chlorinated polystyrene can be used, or there can be substituted other flame retardant compounds such as decabromodiphenyl ether.

I claim:

1. A method of producing a foamed flame retardant thermoplastic composition substantially free of surface streaking and without odor generation, said composition comprising (a) a polyphenylene ether, alone, or in combination with a styrene resin; (b) an effective flame retarding amount of a halogenated flame retardant, alone, or in further combination with an antimony compound, said method comprising (i) adding to said composition an effective foam generating amount of (c) a foaming agent comprising citric acid and sodium bicarbonate; and (ii) foaming the composition of step (i).

2. The method of claim 1 wherein component (a) is present in an amount of from 75 to 99 parts by weight, component (b) is present in an amount of 1 to 25 parts by weight and the foaming agent (c) is added in an amount of 0.05 to 1.5 parts by weight, per 100 parts by weight of (a), (b) and (c) combined.

3. The method of claim 11, wherein the polyphenylene ether resin (a) is a homopolymer or copolymer containing structural units of the formula

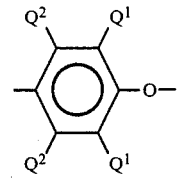

in which for each of these units independently each $Q^1$ hydrogen, halogen, primary or secondary lower alkyl having up to seven carbon atoms, phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ independently hydrogen, halogen, primary or secondary lower alkyl, phenyl, haloalkyl, hydrocarbonoxy or halohydrocarbonoxy as defined for $Q^1$.

4. The method of claim 1, wherein the poly-phenylene ether resin (a) is poly(2,6-dimethyl-1,4-phenylene ether).

5. The method of claim 4, wherein the poly(2,6-dimethyl-1,4-phenylene ether) has an intrinsic viscosity of about 0.4 to 0.5 deciliters per gram in chloroform at 25° C.

6. The method of claim 1, wherein the poly-phenylene ether resin (a) is poly(2,6-dimethyl-co-2,3,6-trimethyl-1,4-phenylene ether).

7. The method of claim 1, wherein the styrene resin is a high impact rubber modified styrene resin.

8. The method of claim 1, wherein the foaming agent comprises 10 to 90% by weight of citric acid and, correspondingly, 90 to 10% by weight of sodium bicarbonate.

9. The method of claim 11 wherein the halogenated flame retardant is brominated styrene having the formula:

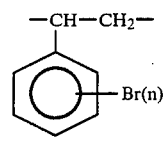

wherein n is from 1 to 5.

10. The method of claim 9, wherein is about 2.8.

* * * * *